April 18, 1967 D. W. MAYNE 3,315,089

SENSE AMPLIFIER

Filed Oct. 14, 1963 2 Sheets-Sheet 1

DAVID W. MAYNE
INVENTOR.

BY Samuel Lindenberg
Arthur Frielich
ATTORNEYS

DAVID W. MAYNE
INVENTOR.
BY Samuel Lindenberg
Arthur Frelich
ATTORNEYS 3,315,089
SENSE AMPLIFIER David W. Mayne, Woodland Hills, Calif., assignor to Ampex Corporation, Culver City, Calif., a corporation of California Filed Oct. 14, 1963, Ser. No. 315,945
4 Claims. (Cl. 307—88.5)

This invention relates generally to digital memory systems and more particularly to improved sense amplifier means for use therein.

Conventional random access digital memories of, e.g. the magnetic core type usually consist of a series of memory planes, each plane comprising a rectangular core matrix. It is common practice to provide a number of cores in each plane equal to the word storage capacity of the memory and a number of planes equal to the bit length of each word. Thus, each of the cores in a plane can represent a corresponding bit in a different word. Selection means are provided which are either of the coincident current or word organized type but which, in either event, act on one core in each plane to either cause information to be written therein or read therefrom. Readout is accomplished with magnetic cores by effectively causing the selection means to write a predetermined bit, e.g. a "0" into all cores storing bits of a selected word thereby causing those cores which store a "1" to switch. As a result of a core switching, a pulse is induced in a sense line which is threaded therethrough and in addition through all the cores in the same plane. A different sense amplifier connected to each sense line detects the induced pulse and in turn provides an output signal which can be used, e.g. to load a register.

The rate at which the entire digital memory system can be operated depends to a great extent upon the characteristics of the sense amplifiers. Conventional sense amplifiers, somewhat as a result of their complexity, are usually relatively slow and limit the speed of the entire memory system. More particularly, conventional sense amplifiers usually consist of two pre-amplifier stages, a rectifier stage, a direct current restoration stage, and a discriminator. Such circuits often suffer from paralysis after the passage of large overload signals due to energy storage in reactive components and thus require the provision of relatively long recovery periods. Moreover, because the sense amplifier stages prior to the discriminator have to be designed for extremely stable operation in order to accurately maintain a suitable discrimination level, they are relatively expensive and somewhat less reliable and accurate than might be desired.

In addition to the aforementioned sense amplifier characteristics, other significant characteristics of a sense amplifier intended to be used in digital memory systems are that it have a high input impedance, be capable of sensing bipolar pulses, and have good common mode rejection capabilities.

In view of the above, it is an object of this invention to provide an improved sense amplifier suitable for use with digital memories which operates significantly faster than conventional sense amplifiers and which thus significantly reduces the access time of a digital memory.

It is an additional object of this invention to provide an improved sense amplifier which does not utilize reactive elements and therefore avoids requiring the provision of a long recovery period.

It is still an additional object of this invention to provide a sense amplifier suitable for use with digital memories which has a high input impedance, is capable of sensing bipolar pulses, and which in addition has a relatively good common mode rejection capability.

Briefly, the invention herein is directed to a sense amplifier which utilizes a pair of tunnel diode discriminators, each biased for bistable operation and connected to a different half of a differential amplifier circuit. An excursion of sufficient amplitude of the voltage input signal applied to the differential amplifier occurring simultaneously with the application of a strobe pulse thereto causes sufficient current in one of the differential amplifier circuit halves (depending upon the input signal polarity) to switch the tunnel diode connected thereto to a second state. Both tunnel diodes are connected to the input of an Or gate which provides an output signal in response to either of the tunnel diodes switching.

In order to establish a substantially constant discrimination level, it is necessary to provide a hightly stable differential amplifier but in addition it is essential that the amplifier have sufficient gain so as to minimize temperature variation effects which would otherwise shift the discrimination level. Merely connecting a pair of differential amplifiers in tandem would provide sufficient gain but would tend to reduce the sense amplifier bandwidth due to the Miller effect which acts to effectively increase the amplifier base-collector capacitance. One of the significant features of the invention herein comprises the arrangement of a relatively high gain differential amplifier which avoids such Miller effect limitations.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*b*) is a waveform chart illustrating the operation of the memory system of FIGURE 1(*a*);

Figure 1A:
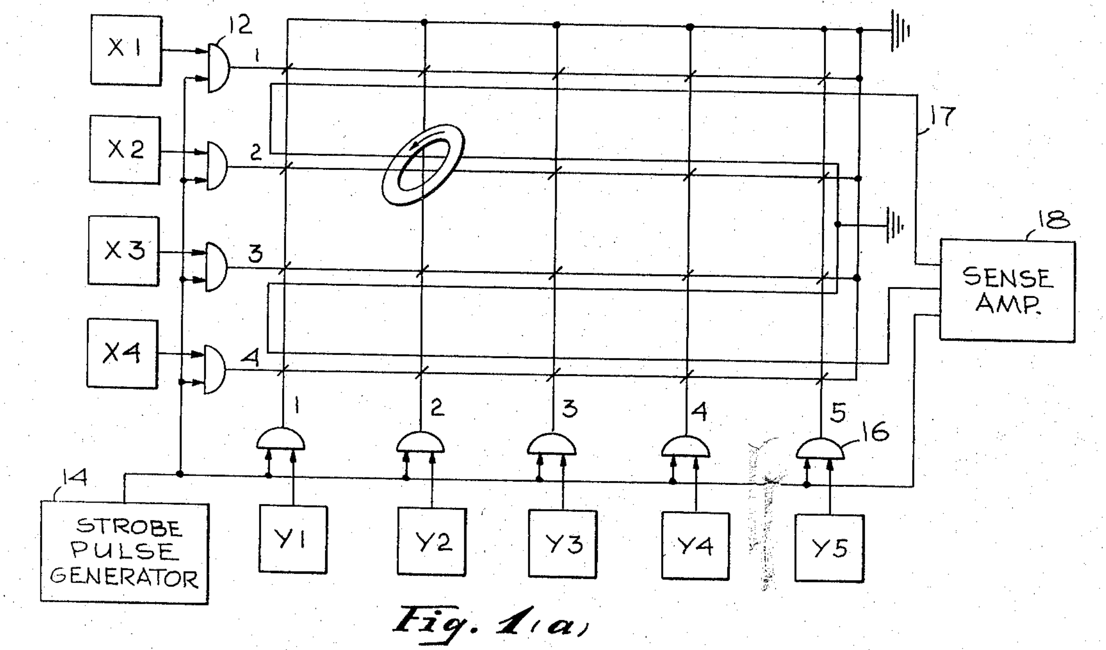
FIGURE 1(*a*) is a schematic diagram of a digital memory system including a sense amplifier.

Attention is now called to FIGURE 1(*a*) of the drawings which schematically illustrates a conventional digital memory plane comprised of a rectangular magnetic core matrix. The exemplary plane includes four rows and five columns of cores and would, e.g., be suitable for use in a twenty word memory. A number of planes equal to the number of bits per word would be provided.

The typical memory plane illustrated in FIGURE 1(*a*) is assumed to be of the coincident current type and consequently includes four different row drive lines and five different column drive lines. Connected to the left end of each row drive line is the output of an And gate 12 while the right end of each row drive line is grounded. Each row drive line is threaded through five magnetic cores. The output of a strobe pulse generator 14 is connected to the input of each of the And gates 12 along with the output of a different one of the row drivers X1, X2, X3, and X4.

The lower end of each of the column drive lines is connected to the output of And gate 16 while the upper ends thereof are connected to ground. The strobe pulse generator 14 is connected to the input of each of the And gates 16 together with the output of one of the column drivers Y1, Y2, Y3, Y4, and Y5. The details of how the row and column drive lines are threaded through the cores are illustrated for an exemplary core in row 2 and column 2.

In addition to having a row drive line and a column drive line threaded through each core, a sense line is threaded through all of the cores in the plane and connected to the input of a sense amplifier 18. A center point on the sense line is preferably grounded. The output of the strobe pulse generator 14 is also connected to the sense amplifier 18.

For an understanding of how the memory plane of FIGURE 1(*a*) is operated, consider the waveforms of FIGURE 1(*b*). Note that the strobe pulse generator provides a series of negative pulses which define memory cycles. Assume when the first strobe pulse is generated, driver X2 is true and driver Y2 is false and as a consequence, a pulse will be developed on row line 2 which tends to switch the flux in the row 2 column 2 core in a clockwise direction. Assuming the flux in the row 2 column 2 core to be oriented in a counter clockwise direction, this pulse will be insufficient to switch the core flux. However the pulse in row drive line 2 may be sufficient to couple a signal into the sense line 17 which of course is applied to the input of the sense amplifier 18 as indicated in FIGURE 1(*b*). Similarly, when the generation of a strobe pulse causes a pulse to be developed on column line 2 and not on row line 2 a similar pulse may be induced in sense line 17 and applied to the sense amplifier 18. In both of these aforementioned situations, the output of the sense amplifier 18 should not reflect the pulse applied to its input inasmuch as it is desired that the sense amplifier only indicate actual switching of a core.

When the generation of a strobe pulse develops pulses on both row drive line 2 and column drive line 2, the flux in the row 2 column 2 core will be switched, thereby inducing a large pulse in sense line 17. The output of the sense amplifier 18 should reflect the input of a large pulse thereto as is indicated concurrent with strobe pulse 3 in FIGURE 1(*b*).

Thus, the function of the sense amplifier 18 should now be clearly understood. That is, the sense amplifier should discriminate betwen signal excursions or pulses applied thereto whose amplitude is less than a predetermined threshold and pulses applied thereto whose amplitude is greater than a predetermined threshold. In a typical situation, the sense amplifier 18 is required to discriminate between a maximum signal of 10 mv. encountered when the core is not actually switched and a minimum signal of 20 mv. which is produced when the core is actually switched.

Figures 1B, 2:
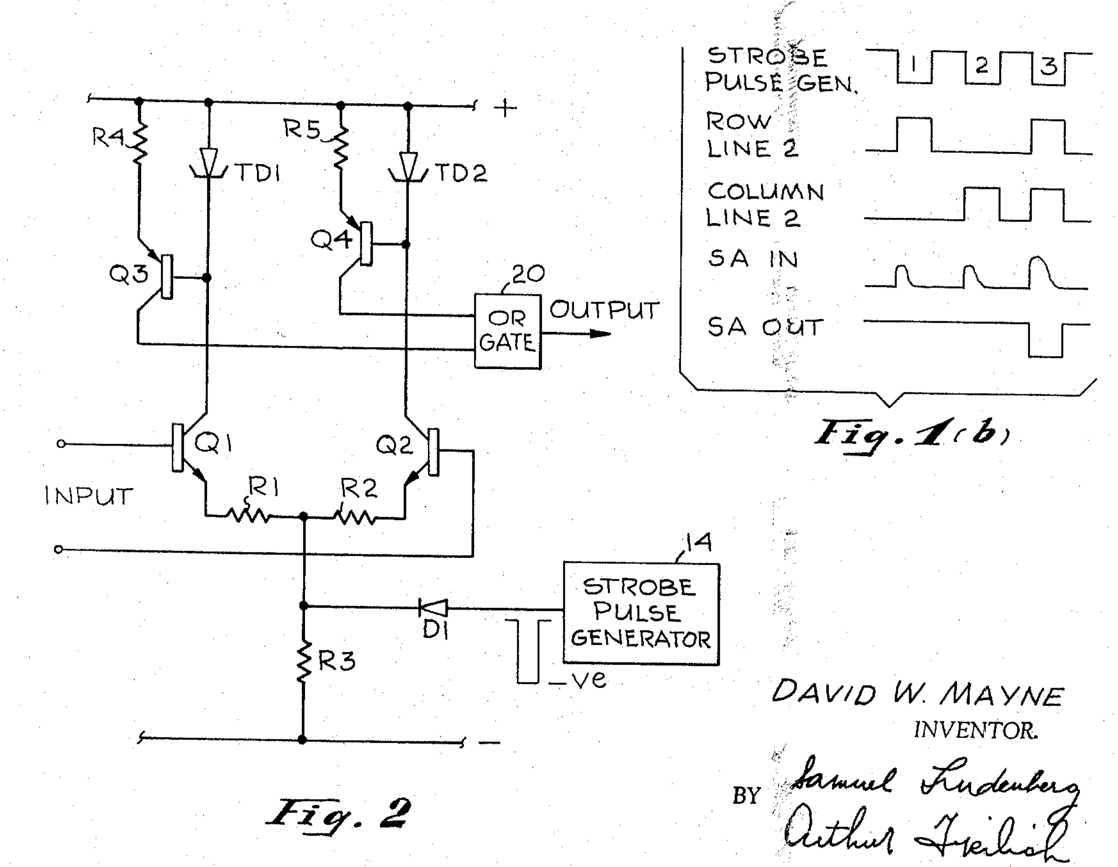
FIGURE 2 is a circuit diagram of a basic sense amplifier constructed in accordance with the present invention.

A basic embodiment of a sense amplifier arrangement in accordance with the invention is illustrated in FIGURE 2 and includes a differential amplifier comprised of transistors Q1 and Q2, each illustrated as being of the NPN type. An impedance path consisting of serially connected resistors R1 and R2 is connected between the emitters of transistors Q1 and Q2. The first terminal of a resistor R3 is connected to the junction between the resistors R1 and R2.

The collectors of the transistors Q1 and Q2 are respectively connected to the cathode terminals of tunnel diodes TD1 and TD2. The relatively positive terminal of a potential source (not shown) is connected to the anode terminals of the tunnel diodes TD1 and TD2 and the relatively negative terminal of the potential source is connected to the second terminal of resistor R3. The cathode of a conventional diode D1 is connected to the junction between resistors R1 and R2 and the anode thereof is connected to the output of the strobe pulse generator 14 of FIGURE 1(*a*). The sense line 17 of FIGURE 1(*a*) is connected between the bases of the transistors Q1 and Q2.

As is well known in the art, tunnel diodes can be biased for bi-stable operation such that the tunnel diode can assume either a relatively high current low voltage state or a relatively low current high voltage state. The tunnel diode can be switched from the high current low voltage state to the low current high voltage state by increasing the current therethrough to a value greater than a peak current $I_p$. That is, the tunnel diode will switch if $I_{in}$ is greater than $I_p - I_b$ where $I_{in}$ is the additional input current to the tunnel diode and $I_b$ is the current through the tunnel diode in its stable high current low voltage state.

With little or no voltage difference between the bases of transistors Q1 and Q2 both tunnel diodes TD1 and TD2 will be conducting in their high current low voltage state whenever a strobe pulse is generated. By assuring that the base potential of both transistors Q1 and Q2 does not go more positive than the output of the strobe pulse generator between the generation of successive strobe pulses, in the absence of a strobe pulse, both transistors Q1 and Q2 are cut off and essentially zero current flows through them and their associated tunnel diodes. When a strobe pulse is generated, the junction between the resistors R1 and R2 is driven negative. If, the potential difference across the bases of transistors Q1 and Q2 is sufficiently high concurrent with the development of a strobe pulse, then a sufficient current change $I_{in}$ will exist in the emitter-collector path of one of the transistors and tunnel diode connected in series therewith. If this current change $I_{in}$ is greater than $I_p - I_b$, then the tunnel diode will switch to its low current high voltage state. On the other hand, if the differential voltage applied between the bases of transistors Q1 and Q2 is of an insufficient amplitude, then neither of the tunnel diodes will switch. In this manner, discrimination between the low amplitude pulses applied to the input of the sense amplifier concurrent with the generation of strobe pulses 1 and 2 of FIGURE 1(*b*) will be insufficient for the sense amplifier to provide an output pulse while the pulse provided to the input of the sense amplifier concurrent with the generation of strobe pulse 3 will be sufficient.

The state of the tunnel diodes is sensed by connecting the base and emitter of a PNP transistor across the tunnel diode terminals. More particularly, the emitter of transistor Q3 is connected through a resistor R4 to the anode terminal of tunnel diode TD1. The base of transistor Q3 is connected to the cathode terminal of tunnel diode TD1 and the collector of transistor Q3 is connected to the input of an Or gate 20. Similarly, the emitter of transistor Q4 is connected through resistor R5 to the anode terminal of tunnel diode TD2 and the base of transistor Q4 is connected to the cathode terminal of tunnel diode TD2. The collector of transistor Q4 is connected to a second input of the Or gate 20. When the voltage across either of the tunnel diodes TD1 or TD2 is sufficiently high, that is when it is in its low current high voltage state, the corresponding transistor Q3 or Q4, will be forward biased so as to provide an input to the Or gate 20 which in turn provides an output pulse.

The basic circuit of FIGURE 2 has several features which make it attractive for use as a sense amplifier in digital memory systems. Significant among these features is that because no reactive components are required, no direct current restoration is required and circuit operation is therefore fast. Additionally, due to the inherent speed of the tunnel diodes, overall operation of the sense amplifier is extremely fast. Further, the sense amplifier can be easily controlled by a strobe pulse generator as indicated. Still further, the circuit has a high input impedance which is essential in order to assure proper operation of the core plane and the resistive feedback arrangement in the emitter circuit assures a high circuit output impedance which ideally suits the differential amplifier for use with a current level discriminator, as a tunnel diode.

Although the circuit of FIGURE 2 is well suited for operation in certain environments, its operation is somewhat less than satisfactory in environments where significant temperature variations have to be tolerated. More particularly, in order to assure stability of the differential amplifier by developing sufficient feedback by using a large valued resistor R3, the output signal to the tunnel diodes (i.e. $I_{in}$) is relatively small (on the order of 100 microamps in an experimental model of the invention). If $I_{in}$ is small, then $I_p-I_b$, the discrimination level, must also be small and hence small changes in $I_p$ or $I_b$ cause relatively large changes in the discrimination level, which of course is exceedingly undesirable. Although the current $I_b$ can be precisely controlled, the quantity $I_p$ is a tunnel diode parameter whose temperature coefficient varies, in sign and magnitude and therefore cannot be precisely controlled unless the temperature shifts are precisely measured or temperature control means are provided. Although temperature control means can be satisfactorily utilized to assure proper operation of the circuit of FIGURE 2, circuit modifications, as illustrated in FIGURE 3, can be utilized to eliminate temperature variation effects.

Figure 3:
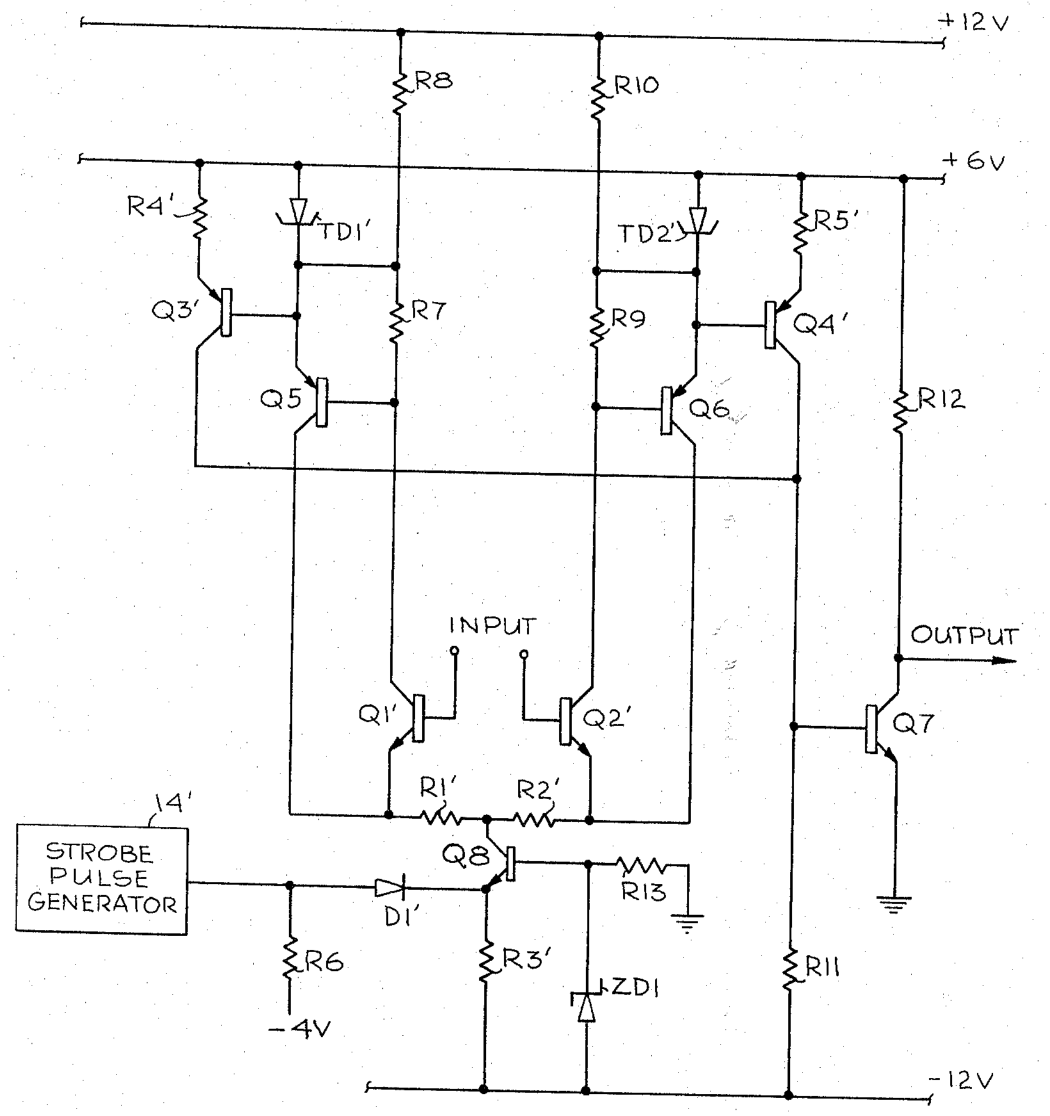
FIGURE 3 is a circuit diagram of a preferred embodiment of the present invention.

Essentially, the circuit modifications introduced in FIGURE 3 increases the gain of the differential amplifier so that $I_{in}$ is significantly increased permitting the discrimination level to be much greater so that percentage changes in discrimination level are much smaller in response to variations in the quantity $I_p$. Although it is thus apparent that the circuit of FIGURE 2 can be considerably improved by increasing the gain of the differential amplifier employed, modification of the differential amplifier of FIGURE 2 to so increase the gain cannot be accomplished in a straightforward manner. The reason is that the mere introduction of an additional stage of differential amplification would also cause reduced bandwidth because of the Miller effect. That is, a straightforward coupling of a pair of differential amplifier circuits would require the provision of resistance in the collector circuits of the first differential amplifier circuits which would provide sufficient collector voltage swing to assure sufficient gain. Unfortunately, as explained by the Miller effect, the input capacitance would be increased so as to reduce the circuit bandwidth which would then render the circuit pair unsuitable as a fast response sense amplifier.

Attention is now called to FIGURE 3 which illustrates a preferred sense amplifier embodiment and in which components corresponding to components utilized in the circuit of FIGURE 8 are identified by the same designating characters which however, are primed in FIGURE 3. Thus, first and second NPN transistors Q1′ and Q2′ are provided. The emitters of the transistors Q1′ and Q2′ are connected by serially connected resistors R1′ and R2′. The junction between resistors R1′ and R2′ is connected to the collector of NPN transistor Q8 whose emitter is connected through resistor R3′ to a source of negative potential, nominally shown as −12 volts. The cathode of diode D1′ is connected to the emitter of transistor Q8 and the anode thereof is connected to the output of strobe pulse generator 14′ and through resistor R6 to a source of negative potential nominally shown as −4 volts. The base of transistor Q8 is connected through resistor R13 to ground and through zener diode ZD1 to the −12 volt source.

The collector of transistor Q1′ is connected through a voltage dividing impedance branch including serially connected resistors R7 and R8, to a source of positive potential, nominally shown as +12 volts. Similarly, the collector of transistor Q2′ is connected through serially connected resistors R9 and R10 to the +12 volt source. A second pair of differential amplifier transistors Q5 and Q6 is provided in the circuit embodiment of FIGURE 3. Transistors Q5 and Q6 are of the PNP type and respectively have their bases connected to the collectors of transistors Q1′ and Q2′. The collectors of transistors Q5 and Q6 are connected directly to the emitters of transistors Q1′ and Q2′. The emitters of transistors Q5 and Q6 are respectively connected to the cathode terminals of tunnel diodes TD1′ and TD2′ and to the junctions between resistors R7 and R8 and resistors R9 and R10. The anode terminals of tunnel diodes TD1′ and TD2′ are each connected to a source of positive potential, nominally shown as +6 volts.

PNP transistors Q3′ and Q4′ are provided for sensing the states of the tunnel diodes TD1′ and TD2′ respectively. The emitter of transistor Q3′ is connected through resistor R4′ to the anode terminal of tunnel diode TD1′ while the base of transistor Q3′ is connected to the cathode terminal of the tunnel diode TD1′. Similarly, the emitter of transistor Q4′ is connected through resistor R5′ to the anode terminal of tunnel diode TD2′ while the base of the transistor Q4′ is connected to the cathode terminal of the tunnel diode TD2′. The collectors of transistors Q3′ and Q4′ are connected to the input of an Or circuit including NPN transistor Q7.

More particularly, the collectors of transistors Q3′ and Q4′ are connected through resistor R11 to a source of negative potential, nominally shown as −12 volts and to the base of transistor Q7. The collector of transistor Q7 is connected through resistor R12 to the +6 volt source and the emitter thereof is connected to ground.

In the operation of the embodiment of FIGURE 3, in the absence of a strobe pulse provided by generator 14′, diode D1′ conducts through resistors R6 and R3′ and transistor Q8 is cut off. In the presence of a strobe pulse diode D1 is cut off and transistor Q8 conducts. Current flows continuously through resistor R13 and zener diode ZD1 maintaining a constant −6 volts on the base of transistor Q8. A differential voltage applied between the bases of transistors Q1′ and Q2′ will cause an increased current flow through the base-emitter circuits of transistors Q5 and Q6 in the presence of a strobe pulse. As a consequence, the current in the emitter-collector path of either transistor Q5 or Q6 will increase thereby switching either tunnel diode TD1′ or TD2′, assuming the sufficiency of the differential input voltage. In turn, either transistor Q3′ or Q4′ will be forward biased which will make the base of transistor Q7 go positive and lower its collector potential to ground. It should be noted that the coupling between transistor Q1′ and Q5 is such that large voltage swings do not occur at the collector of transistor Q1′ and therefore serious Miller effect limitations are avoided.

It is to be noted that the differential amplifier circuit of FIGURE 3 provides a greater gain between the input and the tunnel diodes than the differential amplifier circuit of FIGURE 2. Consequently, the disadvantageous discriminator level changes in response to temperature variations previously discussed are avoided. The embodiment of FIGURE 3 however retains all the significant advantages of FIGURE 2.

It is pointed out that the circuit means of FIGURE 2 connecting the strobe pulse generator to the transistors Q1 and Q2 could be used in FIGURE 3 in lieu of the circuitry shown. In this event, use of a high value resistor R3′ assures good common mode rejection, i.e. assures that the sense amplifier does not provide an output pulse when there is an insufficient difference between the potentials applied to the bases of transistors Q1′ and Q2′, regardless of the magnitude of the voltage applied thereto. Although somewhat more expensive, the circuitry associated with the strobe pulse generator shown in FIGURE 3 has certain advantages over the circuitry of FIGURE 2. More particularly, in the presence of a strobe pulse, the collector of transistor Q8 presents a high output impedance when conducting assuring good common mode rejection. When the strobe pulse is not present and transistor Q8 is thus cut off, the sense amplifier is completely insensitive to large unwanted signals at the input.

From the foregoing, it should be appreciated that an improved highly sensitive and fast sense amplifier suitable for use in digital memory systems and characterized by the use of tunnel diode discriminators in combination with an advantageously arranged multi-stage differential amplifier, has been disclosed.

What is claimed is:

1. A sense amplifier circuit for use with a digital memory for detecting the presence of a signal having greater than a predetermined amplitude comprising a differential amplifier having first and second input terminals and including first and second transistors, each transistor having a base, a collector, and an emitter; means respectively connecting said first and second input terminals to said first and second transistor bases; means for applying said signal between said first and second input terminals; means interconnecting said first and second transistor emitters; first and second tunnel diodes; first and second amplifier means respectively connecting said first and second tunnel diodes to said first and second transistor collectors; means biasing said tunnel diodes for bistable operation; and means for sensing the states of said first and second tunnel diodes.

2. The sense amplifier of claim 1 wherein said first and second amplifier means respectively comprise third and fourth transistors each having a base, a collector, and an emitter;

means respectively connecting said first and second transistor collectors to said third and fourth transistor bases; and means respectively connecting said first and second tunnel diodes in series with the emitter-collector paths of said third and fourth transistors.

3. In combination with first and second terminals between which appears a signal having random amplitude excursions of greater and less than a predetermined amount, sense amplifier means responsive to said excursions greater than said predetermined amount comprising first and second transistors, each having a base, a collector, and an emitter; biasing means interconnecting said first and second transistor emitters and responsive to an increased current in the emitter-collector path of either of said first and second transistors for reducing the current in the emitter-collector path of the other of said first and second transistors; first and second impedances respectively serially connected in the emitter-collector paths of said first and second transistors; means respectively connecting said first and second terminals to said bases of said first and second transistors; third and fourth transistors each having a base, a collector, and an emitter; means respectively connecting said third and fourth transistor emitters to a first end of said first and second impedances; means respectively connecting said third and fourth transistor bases to a second end of said first and second impedances and to said first and second transistor collectors; first and second current controlled bistable elements; means respectively connecting said first and second current controlled elements in series in the emitter-collector paths of said third and fourth transistors; and means sensing the state of said current controlled elements.

4. The combination of claim 3 wherein each of said current controlled elements comprises a tunnel diode.

References Cited by the Examiner

UNITED STATES PATENTS

| | | | |
|---|---|---|---|
| 3,211,921 | 10/1965 | Kaufman et al. | 307—88.5 |
| 3,215,854 | 11/1965 | Mayhew | 307—88.5 |

ARTHUR GAUSS, *Primary Examiner.*

J. ZAZWORSKY, *Assistant Examiner.*